(12) United States Patent
Altmann et al.

(10) Patent No.: US 7,987,957 B2
(45) Date of Patent: Aug. 2, 2011

(54) BUSHING-TYPE ROLLER OVERRUNNING CLUTCH WITH A CAGE FOR NEEDLES OR ROLLERS

(75) Inventors: Frieder Altmann, Pommersfelden (DE); Swen Dörrie, Herzogenaurach (DE); Peter Ruffershöfer, Herzogenaurach (DE)

(73) Assignee: Schaeffler KG, Herzogenaurach (DE)

( * ) Notice: Subject to any disclaimer, the term of this patent is extended or adjusted under 35 U.S.C. 154(b) by 630 days.

(21) Appl. No.: 11/989,207

(22) PCT Filed: Jul. 1, 2006

(86) PCT No.: PCT/EP2006/006420
§ 371 (c)(1),
(2), (4) Date: Feb. 11, 2008

(87) PCT Pub. No.: WO2007/031131
PCT Pub. Date: Mar. 22, 2007

(65) Prior Publication Data
US 2009/0260941 A1    Oct. 22, 2009

(30) Foreign Application Priority Data
Jul. 21, 2005   (DE) .......................... 10 2005 034 039

(51) Int. Cl.
*F16D 41/066* (2006.01)
(52) U.S. Cl. ................ 192/45; 29/898.066; 29/898.067; 72/348
(58) Field of Classification Search ............... 192/45; 188/82.84; 29/898.065
See application file for complete search history.

(56) References Cited

U.S. PATENT DOCUMENTS

| | | | |
|---|---|---|---|
| 3,528,534 A * | 9/1970 | Benson et al. | 192/45 |
| 3,731,774 A | 5/1973 | Kitchin | |
| 3,955,659 A | 5/1976 | Ehret | |
| 2002/0148696 A1 | 10/2002 | Enomoto | |
| 2003/0029686 A1 | 2/2003 | Pascoe | |
| 2005/0034951 A1 | 2/2005 | Takasu | |

FOREIGN PATENT DOCUMENTS

| | | |
|---|---|---|
| DE | 1 625 743 | 4/1972 |
| DE | 21 34 618 | 1/1973 |
| DE | 24 35 811 | 2/1976 |
| DE | 41 28 812 A1 | 4/1993 |
| DE | 100 07 620 A1 | 11/2000 |
| DE | 101 52 650 A1 | 4/2003 |
| FR | 2 266 828 | 10/1975 |
| GB | 2 110 776 A | 6/1983 |
| GB | 2225 067 A | 5/1990 |
| JP | 60 188630 | 9/1985 |

* cited by examiner

*Primary Examiner* — Richard M. Lorence
(74) *Attorney, Agent, or Firm* — Charles A. Muserlian

(57) ABSTRACT

A bushing-type roller overrunning clutch comprising at least an inner or an outer ring that comprises clamping ramps adapted to the needles or rollers, said overrunning clutch further comprising a cage for the needles or rollers, as also pressure springs, said cage comprising cage elements that are made in one piece with the inner or outer ring, and a method of making a bushing-type roller overrunning clutch in which the inner or outer ring together with the clamping ramps and at least one border arranged on one side of the clamping ramps is made by deep-drawing, spring-retaining lugs are cut out of the border, and the spring-retaining lugs are bent radially towards the inner or outer ring and the free-standing tabs of the spring-retaining lugs are bent over into the region of the clamping ramps.

7 Claims, 5 Drawing Sheets

BUSHING-TYPE ROLLER OVERRUNNING CLUTCH WITH A CAGE FOR NEEDLES OR ROLLERS

This application is a 371 of PCT/EP2006/006420 filed Jul. 1, 2006

FIELD OF THE INVENTION

Bushing-type roller overrunning clutch comprising at least an inner ring or an outer ring comprising clamping ramps adapted to the needles or rollers, and further comprising a cage for the needles or rollers, as also pressure springs.

BACKGROUND OF THE INVENTION

Different designs of a generic bushing-type overrunning clutch are known from the "Technical Handbook" of INA Wälzlager Schaeffler oHG, $5^{th}$ Revised Reprint, pages 270 and 271. These overrunning clutches comprise an outer ring with clamping ramps, a cage with needles being arranged in the outer ring and pressure springs being installed for establishing contact of the needles with the clamping ramps and with a smooth-faced inner ring, or, if used without an inner ring, with a shaft, so that a rapid engagement of the overrunning clutch is assured.

Such overrunning clutches have proved their worth and meet all requirements made of them. However, they are assembled out of a large number of separate parts which are cost-intensive.

OBJECTS OF THE INVENTION

It is therefore an object of the invention to simplify the generic overrunning clutch and make it less expensive without detracting from its proven functioning efficiency.

This and other objects and advantages of the invention will become obvious from the following detailed description.

SUMMARY OF THE INVENTION

The invention achieves the above objects by the fact that the cage comprises cage elements that are made in one piece with the inner or the outer ring. The outer ring against which the needles or rollers bear is also designated as a bushing of the bushing-type roller overrunning clutch.

Within the meaning of the invention, inner or outer ring means that, apart from the prior art overrunning clutches in which the outer ring is provided with clamping ramps, the invention also extends to those overrunning clutches in which the clamping ramps are provided on the outer surface of the inner ring and the needles or rollers are operatively connected to a smooth inner surface of an outer ring, that is to say, a bushing.

Due to the fact that the inner or the outer ring is made in one piece with the cage elements, the prior art cage made as a separate component requiring a high degree of dimensional exactitude is dispensed with.

According to a preferred embodiment of the invention, the inner or the outer ring is made in one piece with clamping ramps and cage elements by the fact that the inner or the outer ring is deep-drawn together with the clamping ramps and with at least one border arranged on one side of the clamping ramps, that spring-retaining lugs are cut out of the border and that the spring-retaining lugs are bent radially towards the inner or outer ring and the free-standing tabs of the spring-retaining lugs are bent over into the region of the clamping ramps.

It may also be pointed out that a border can be provided not only on one but on both sides of the inner or outer ring and spring-retaining lugs can be cut out of both borders, the spring-retaining lugs being bent and the tabs being folded-in alternately on the two sides of the clamping ramps.

In another preferred embodiment of the invention, the spring-retaining lugs are cut only out of one border and then appropriately bent, while on the opposite side of the clamping ramps, an annular shoulder is integrally formed on the inner or outer ring, with a radially inward or outward orientation depending on whether the ring is an inner or an outer ring. In this embodiment, the annular shoulder forms the guide for the needles and even for larger rollers on the one side and the spring-retaining lugs assure guidance on the other side, while the bent-in tabs form supports for springs that press the needles or the rollers into the gap between the clamping ramps and the smooth counter surface. On their sides turned away from the tabs, the spring-retaining lugs may comprise extension tongues that assure or improve the lateral guidance of the needles or rollers.

According to a modified embodiment of the invention, the inner or outer ring is made as a pot-shaped component by deep-drawing and tabs are cut out of a bottom rim and bent over into the region of the clamping ramps. A continuous lateral limitation that is preserved even in the region of the bottom rim after the above operation assures an efficient guidance of the needles, particularly, of larger rollers.

Depending on the action of force on the overrunning clutch and also on the wall thickness of the inner or outer ring, the inner or outer ring can be pressed onto or into a support ring, also called gripping ring, which strengthens the inner or outer ring. This support ring can also be made economically by deep-drawing but equally well by shaping by machining. It may, however, also be explicitly pointed out that both the support ring and the inner or outer ring that is retained on or in this support ring can be made according to the invention out of strip material that is bent into the shape of a ring which is then joined together at its abutting ends, for example, by welding. Further, it is also possible to arrange the outer ring, i.e. the overrunning clutch bushing that is typically provided with clamping ramps, under stress within the closed support ring.

A radially inward or outward projecting collar is formed integrally on the gripping ring, preferably before the gripping ring is pressed together with the inner or outer ring. This collar forms a defined stop between the inner or outer ring and the gripping or support ring, and, depending on its size, it can also support the spring-retaining lugs and close the intermediate spaces between these because the support ring and the inner or outer ring are pressed together preferably in such a way that the collar adjoins the spring-retaining lugs.

BRIEF DESCRIPTION OF THE DRAWINGS

For further elucidation, the invention will now be described with reference to the appended drawings in which an example of embodiment of the invention is illustrated in a simplified manner.

DETAILED DESCRIPTION OF THE DRAWINGS

In FIGS. 1 to 8, as far as shown in the particular figure, an outer ring is identified at 1 and comprises on its inner side, clamping ramps 2 and borders 3 and 4 adjoining the clamping ramps 2. The outer ring 1 is configured, preferably, in the form of a bushing and is made by deep-drawing. But it can also be made of strip material, which is shaped by stamping and then bent into the shape of a ring that is welded together at its abutting ends.

Figure 2:
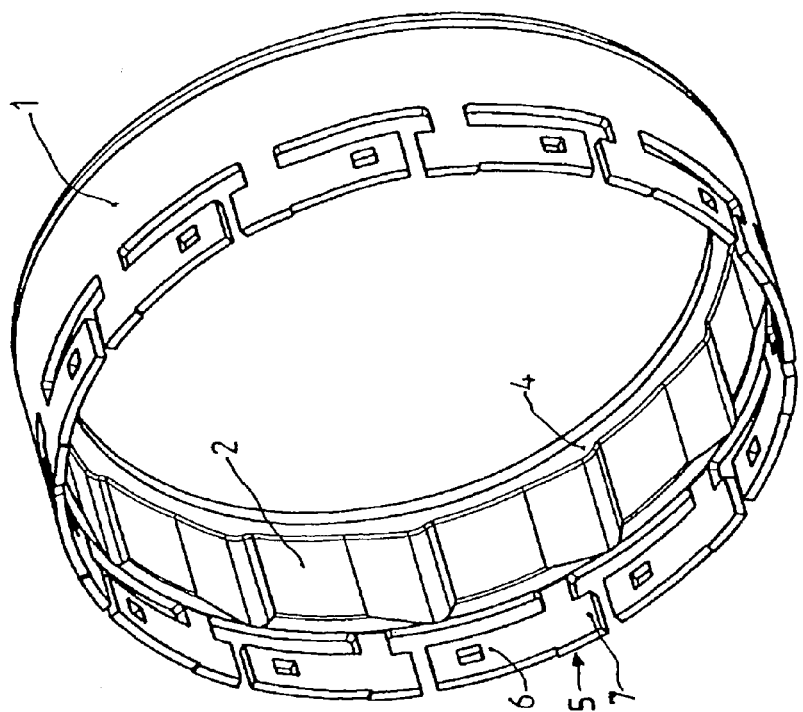
FIG. 2 is a perspective representation corresponding to FIG. 1, in which one border has been worked and spring-retaining lugs have been cut out.
Figure 1:
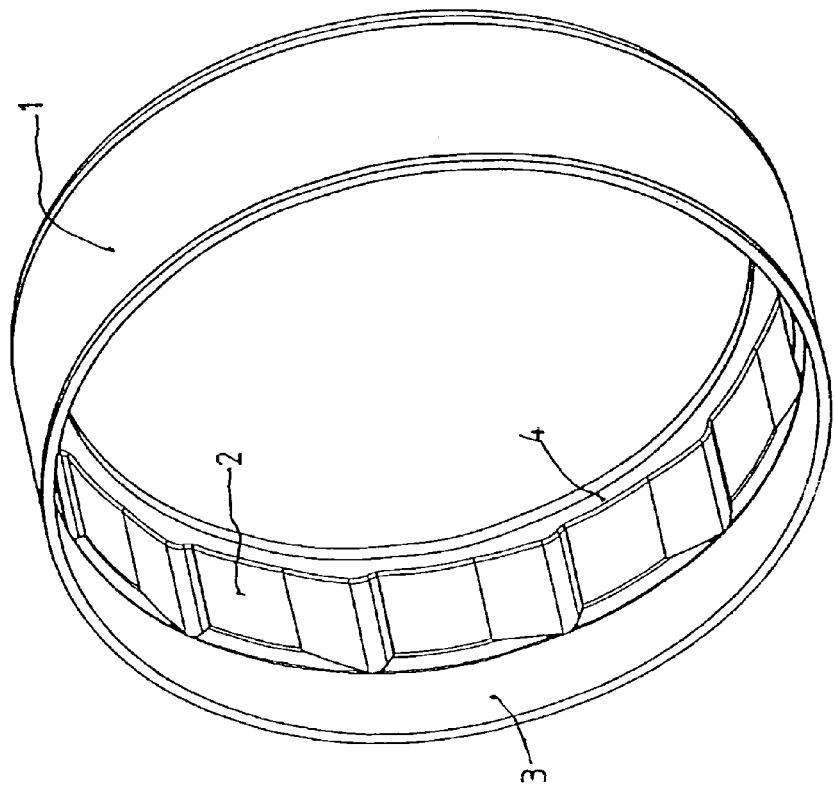
FIG. 1 is a perspective view of an outer ring comprising borders arranged next to the clamping ramps.

As illustrated in FIG. 2, spring-retaining lugs 5 are cut or punched out of the border 3, and the border 4 is bent over to form an annular shoulder that projects radially inwards. In one peripheral direction of the outer ring 1, the spring-retaining lugs 5 comprise tabs 6 and in the other direction, extension tongues 7.

Figure 3:
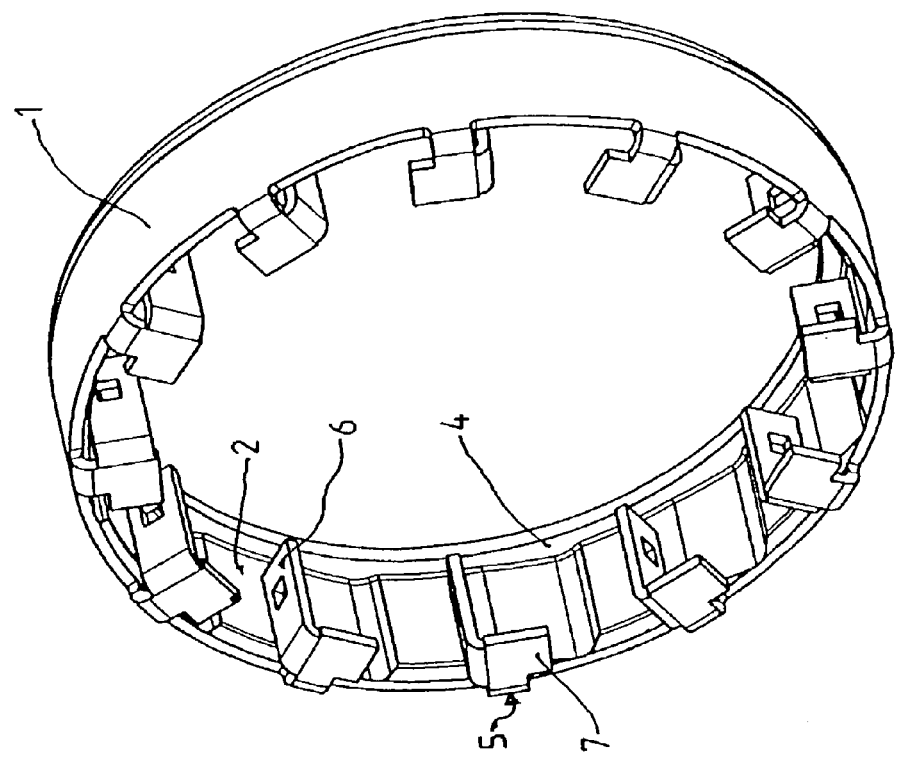
FIG. 3 is a perspective representation corresponding to FIG. 1, in which the tabs of the spring-retaining lugs have been bent over.
Figure 4:
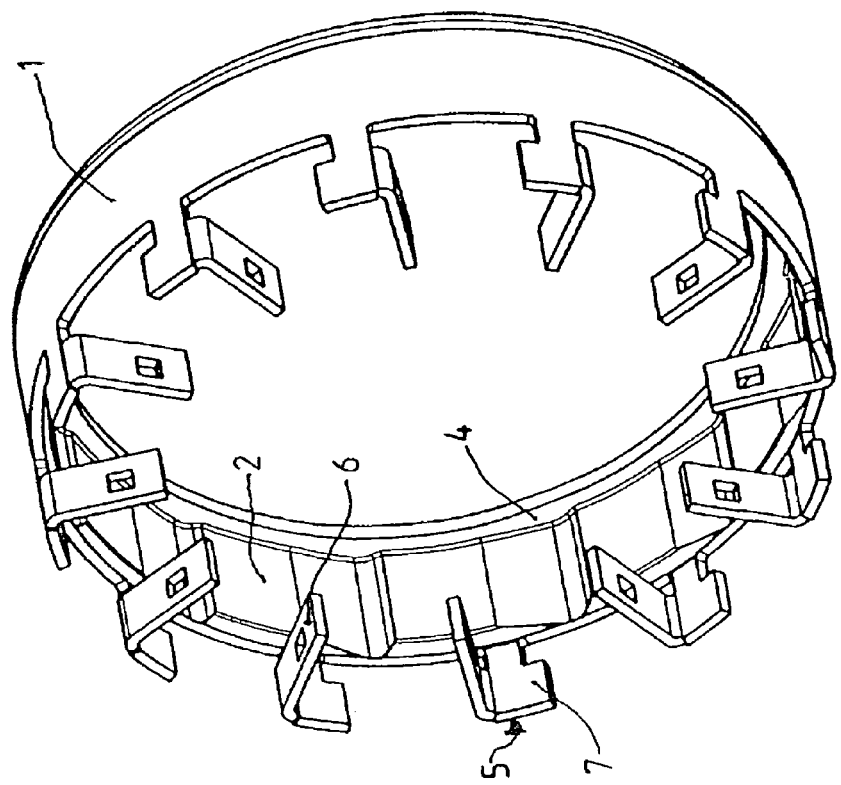
FIG. 4 is a perspective representation corresponding to FIG. 1, in which, additionally, the spring-retaining lugs have also been bent over.
Figure 5:
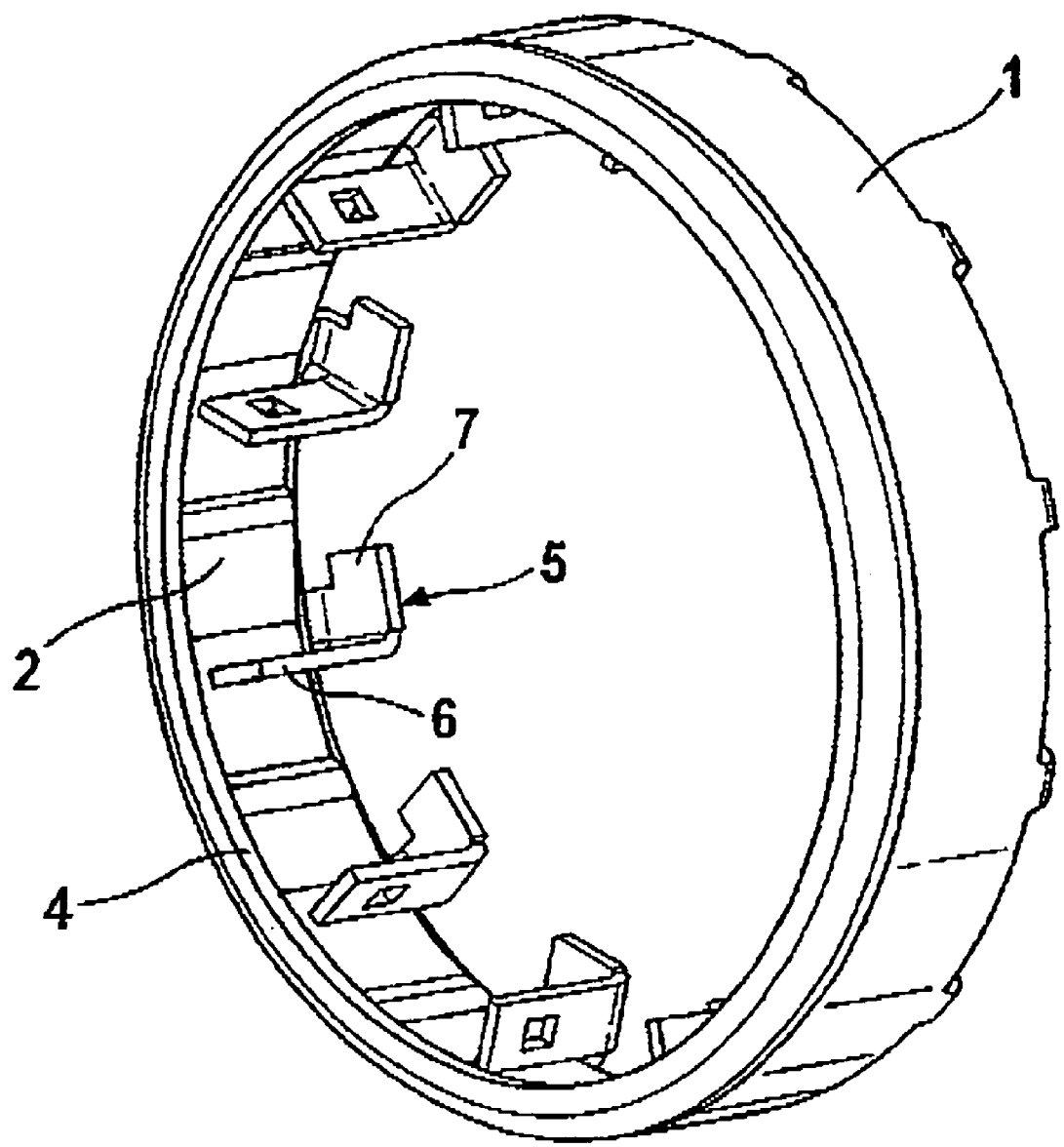
FIG. 5, is a perspective representation corresponding to FIG. 4, with the line of sight directed to the opposite side.

As shown in FIG. 3, the tabs 6 of the spring-retaining lugs 5 are bent through an angle of approximately 90°, the spring-retaining lugs 5 on the outer ring 1 are then bent or folded inwards, so that the tabs 6 extend approximately parallel to the clamping ramps. However, it is also possible, to first bend the spring-retaining lugs 5 through an angle of 90° and then bend over the tabs 6. Not shown in the figures is that it is also possible to bend the tabs or spring-retaining lugs at angles other than 90°.

Needles or rollers are inserted into the ready-shaped outer ring 1 with bent or folded over tabs 6 and spring-retaining lugs 5, and the overrunning clutch is then mounted on an inner ring with a smooth outer surface or on a shaft with a smooth outer surface. If, in place of the outer ring 1, an inner ring comprises the clamping ramps 2 and the integrally formed spring-retaining lugs 5 and tabs 6 that constitute cage elements for guiding the clamping rollers, these parts are inserted into an outer ring with a smooth inner surface or into a solid component, for example, a housing component with an appropriate bore with a hardened surface, and thus form the overrunning clutch.

The length of the projecting extension tongues 7 of the spring-retaining lugs 5 in peripheral direction of the outer ring 1 is such that they assure an adequate axial retention of the needles or rollers. The same applies to the annular shoulder on the opposite side of the clamping ramps 2 on the outer ring 1.

Figure 7:
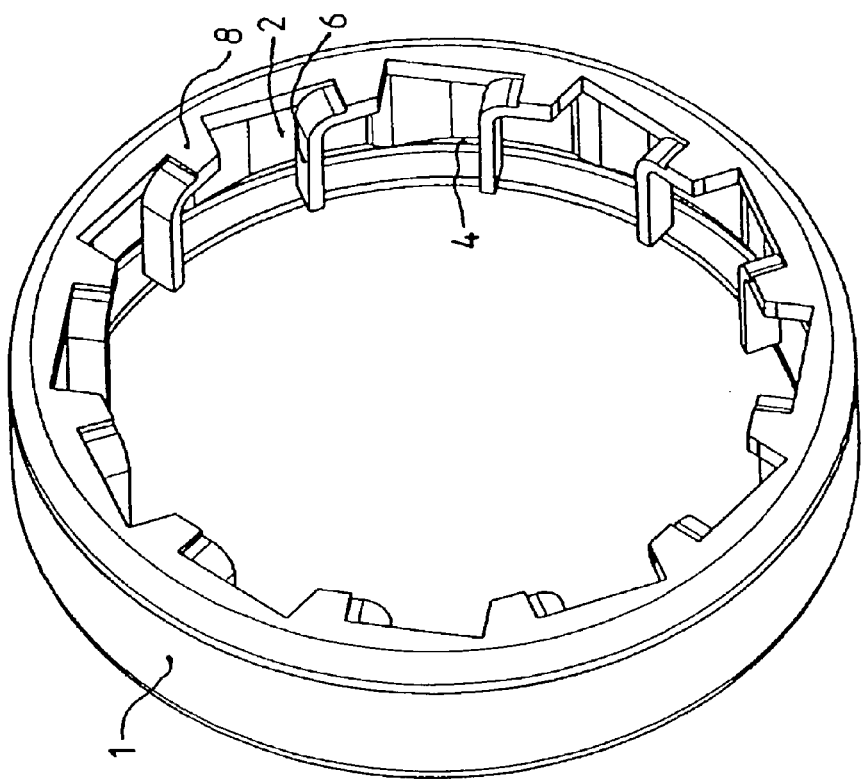
FIG. 7 is a perspective representation corresponding to FIG. 6, with the line of sight directed to the opposite side.
Figure 6:
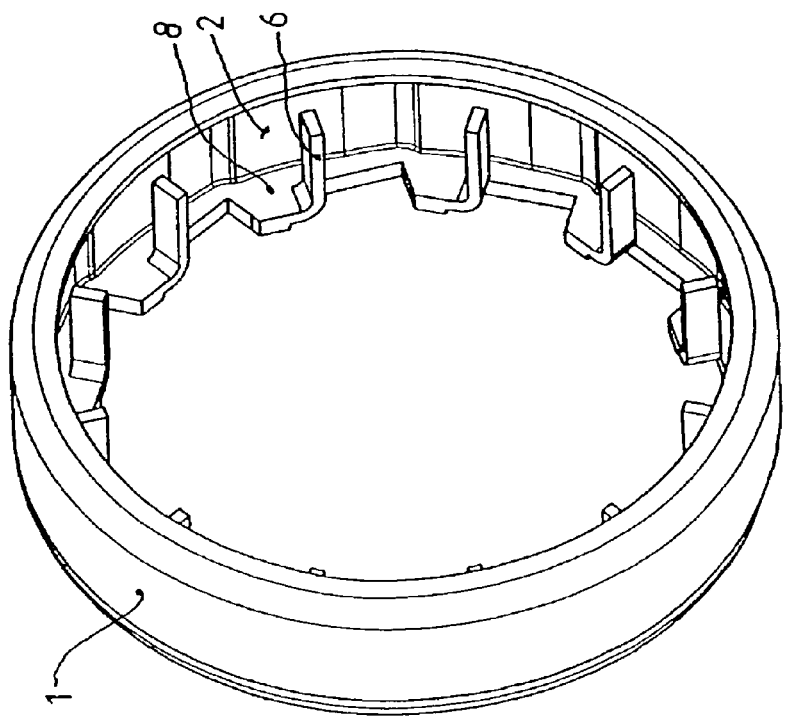
FIG. 6, is a perspective representation of a modified outer ring in which tabs have been cut out and bent over out of an angularly bent border.
Figure 8:
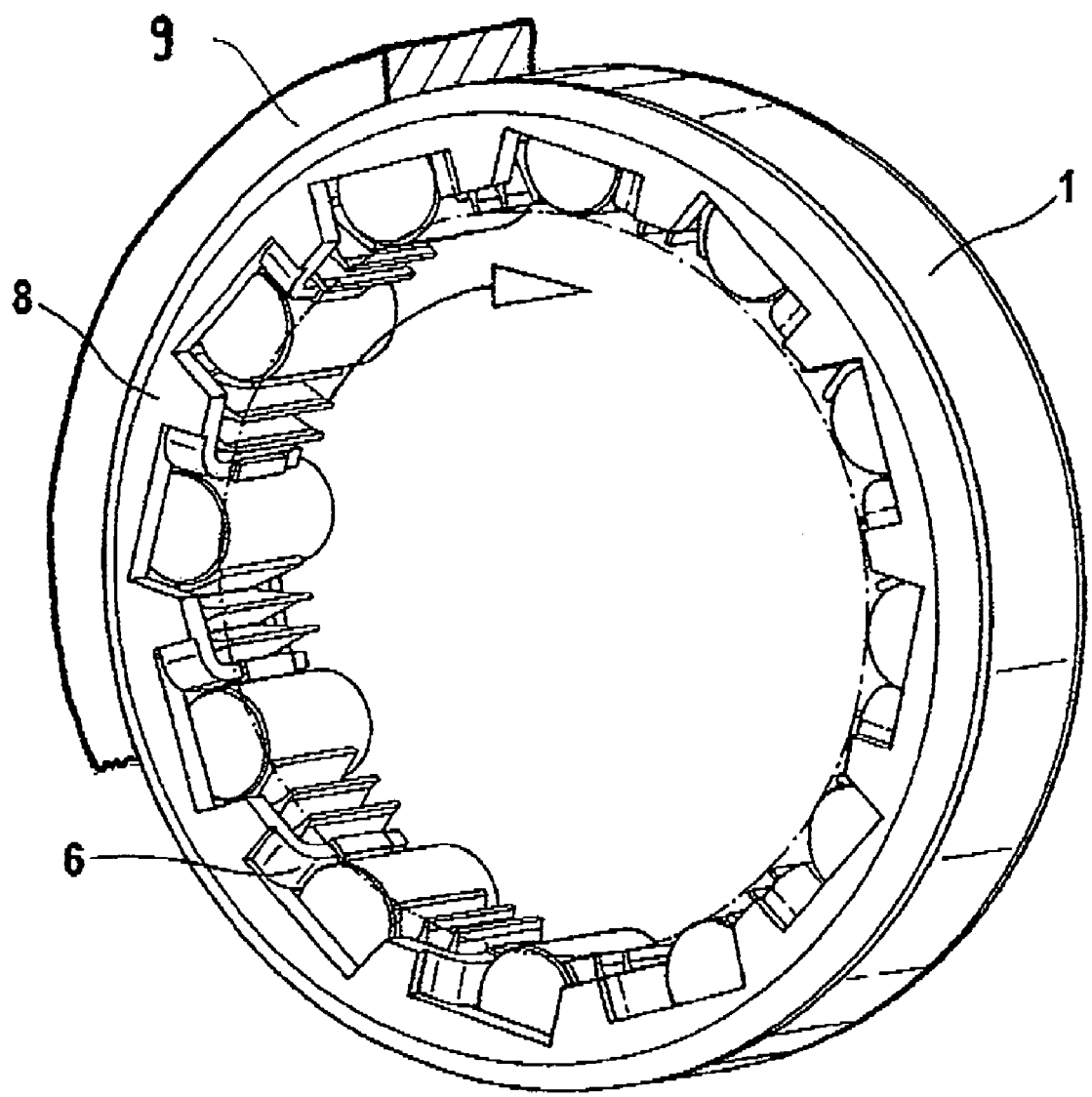
FIG. 8 is a perspective representation of an outer ring ready-assembled with inserted rollers and pressure springs.

In the example of embodiment of FIGS. 6 to 8, the outer ring 1 is made with a bottom or a bottom rim 8 by deep-drawing. Where appropriate, a circular disk is punched out of the bottom. Further, the tabs 6 are cut out of the bottom rim 8 and bent to extend parallel to the clamping ramps. An annular shoulder is then formed integrally on the opposite side. Due to the fact that, in this embodiment, only the tabs are cut out of the bottom rim 8, this bottom rim indeed forms an indented limitation but this limitation is fully effective and continuous, so that a reliable guidance is guaranteed, as can best be seen in FIG. 8, even for larger rollers.

LIST OF REFERENCE NUMERALS

1 Outer ring
2 Clamping ramps
3 Border
4 Border
5 Spring-retaining lugs
6 Tabs
7 Extension tongues
8 Bottom rim

The invention claimed is:

1. A sleeve-type/roller freewheel having at least one inner or outer ring which has clamping ramps which are adapted to needles or rollers, having a cage for the needles or rollers and having pressure springs, the cage having cage segments which are produced in one piece with the inner or outer ring, wherein cage elements are configured as spring holding lugs and are attached laterally to the inner or outer ring, wherein the spring holding lugs have exposed tabs which are arranged inside or outside the inner or outer ring in a manner which is adjacent to the clamping ramps.

2. A sleeve-type/roller freewheel of claim 1 wherein the inner or outer ring has an annular shoulder on the side which faces away from the spring holding lugs.

3. A method for producing a sleeve-type/roller freewheel according to claim 1 comprising:
   deep drawing the inner or outer ring with the clamping ramps and at least one edge which is arranged on one side of the clamping ramps,
   cutting the spring holding lugs out from the edge, and
   bending the spring holding lugs radially to the inner or outer ring and exposed tabs of the spring holding lugs are bent over into the region of the clamping ramps.

4. The method for producing a sleeve-type/roller freewheel, cage, of claim 1 comprising:
   deep drawing the inner or outer ring which with the clamping ramps as a substantially cup-shaped component,
   cutting tabs out from a base edge which is adjacent to the clamping ramps, and
   bending the tabs over into the region of the clamping ramps.

5. The method of claim 3 comprising:
   forming the edges on the inner or outer ring on the side which lies opposite the edge or the base edge, and
   forming the edge over radially as an annular shoulder.

6. The method of claim 3 wherein the inner or outer ring is pressed onto or into a supporting ring.

7. The method of claim 3 wherein a radially inwardly or outwardly protruding collar is formed integrally on the supporting ring, before being pressed with the inner or outer ring.

* * * * *